United States Patent [19]

Kosman et al.

[11] 3,821,590

[45] June 28, 1974

[54] ENCAPSULATED SOLID STATE LIGHT EMITTING DEVICE

[75] Inventors: Karel Jan Williams Kosman; Louis-Philippe Boivin, both of Ottawa, Ontario, Canada

[73] Assignee: Northern Electric Company Limited, Montreal, Quebec, Canada

[22] Filed: Feb. 24, 1972

[21] Appl. No.: 229,140

Related U.S. Application Data

[63] Continuation-in-part of Ser. No. 129,028, March 29, 1971.

[52] U.S. Cl. ............... 313/499, 240/2.1, 240/41.3, 240/106.1

[51] Int. Cl. ........................ H01j 1/62, H01j 63/04

[58] Field of Search .............. 240/8.16, 41.3, 106.1, 240/2.1, 1.2; 313/108 D

[56] References Cited

UNITED STATES PATENTS

| | | | |
|---|---|---|---|
| 2,092,664 | 9/1937 | Bray | 240/22 X |
| 3,043,947 | 7/1962 | Albinger, Jr. | 240/2.1 X |
| 3,278,738 | 10/1966 | Clark | 240/1 LP X |
| 3,321,631 | 5/1967 | Biard et al. | 313/108 D |
| 3,443,140 | 5/1969 | Ing, Jr. et al | 313/108 D |
| 3,593,055 | 7/1971 | Geusic | 313/108 D |
| 3,610,912 | 10/1971 | Schwartz | 240/1.2 |
| 3,696,263 | 10/1972 | Wacher | 313/108 D |

OTHER PUBLICATIONS

Shah, B. R., High Efficiency Electroluminescent Diodes, IBM Technical Disclosure Bulletin, Vol. 9, No. 7, Pg. 947, 12/66.

Sunners, B., Mount for Light Emitting Diode, IBM Technical Disclosure Bulletin, Vol. 8, No. 7, Pg. 1015, 12/65.

Yeh, T. H. et al., Light-Emitting Diode Array, IBM Technical Disclosure Bulletin, Vol. 9, No. 3, pg. 326, 8/66.

*Primary Examiner*—Richard M. Sheer
*Attorney, Agent, or Firm*—Sidney T. Jelly

[57] ABSTRACT

A light emitting device containing an encapsulated light emitting diode, in which the light from the diode is collimated by a reflector and in which the front face of the encapsulated diode is formed with a plurality of lenses which disperse the collimated light. The device can be viewed over a wide angle, for example ±45°, without a readily apparent reduction in brilliance or size. An optical filter—for increased contrast for example—can be used. More than one diode can be positioned in a device. Variation in the form of the lenses provides increased luminous intensity for particular viewing angles and by accepting some loss in effectiveness, for example some sectoring, the viewing angle can be increased up to approximately ±90°.

4 Claims, 13 Drawing Figures

ENCAPSULATED SOLID STATE LIGHT EMITTING DEVICE

This application is a continuation-in-part of U.S. application Ser. No. 129,028 filed Mar. 29, 1971.

This invention relates to solid state light emitting devices, and in particular to the encapsulation of such devices.

Solid state light emitting devices operate on the principle of junction electroluminescence. This principle provides a means for converting electrical energy directly into visible or infra-red narrow-band radiation. Such devices have several inherent advantages over conventional light sources, for example long life, mechanical ruggedness, high reliability, low voltage and power consumption, small size, lightweight, low operating temperatures.

Solid state devices, or lamps, are generally P–N junction semiconductor diodes which emit light by the known phenomenon of electroluminescence, the light generated in the vicinity of the P–N junction which is biased in a forward direction. The radiation can be either invisible -usually infrared- light or light in the visible spectrum.

Light is radiated, or emitted, in different direction, depending upon the type of the semiconductor material and on its geometrical configuration. The light passes through an encapsulating material which must, therefore, have suitable characteristics. Solid state lamps are used in indicators and signal lights. The semiconductor element is made much smaller than would be desirable from human factor requirements, for various reasons, two of which are the high density of the current required through the P–N junction and the relatively high cost of the semiconductor material. As a typical example, an indicator diameter of approximately 0.1 ins. is considered desirable while the size of the P–N junction for an optimal efficiency of the lamp is approximately 0.015 ins. square.

The use of magnifying lens above the element is known, to enhance the apparent size, but the viewing angle is greatly reduced. For example, a lens which gives a satisfactory enlargement of the image, may give a visibility angle of only approximately ±5°. Incorporating a reflector can enhance the apparent size of the lamp, and increase the overall efficiency but a reflector by itself also exhibits limitations in the viewing angle. When viewed from the side only a partial image is visible -known as the "sectoring" effect.

The use of a frosted lens, or an internally diffused lens improves the viewing angle but severely reduces the luminence (brightness). Typically a frosted or diffused lens can reduce brightness from 1,500 ft-L. luminence to 18 ft-L.

The present invention provides a solid state light emitting device, which is encapsulated, with an integral reflector and which produces an image of desirable size, visible within a required viewing angle. Typically, the image can be viewed without substantial sectoring over an angle of approximately ±45°. With some sectoring the image can be viewed over an angle of about ±90°. The encapsulant bonds and seals the device and has a predetermined surface structure onto which most of the light emitted is concentrated. The use of an optical filter for increased contrast can be used with certain embodiments.

Thus in accordance with the invention there is provided a solid state light emitting device comprising: an electroluminescent device; a reflector, the electroluminescent device mounted relative to the reflector such that the majority of the emitted light is reflected in a collimated beam; an encapsulating material encapsulating the electroluminescent device and having a front surface through which the light issues, the front face of polylenticular form to distribute the light within the desired viewing angle.

By minor variations in the form of the concavities, the luminescent properties of a lamp can be varied. Thus the concavities can be completely spherical for uniform light distribution, or, as an example, the concavities can have spherical bottom portions with the outer, or upper, portions of conical formation. This gives an increase in the luminous intensity of the lamp for viewing angles between 20° and 40°.

At some loss in effectiveness the viewing angle can be increased to approximately ±90°. This can be obtained by giving the front surface of the encapsulating material a curved or convex form and by incorporating an internal reflector in the encapsulating material between the electroluminescent device and the front surface.

In one arrangement the polylenticular form comprises a plurality of convexities or concavities, forming one or more series of identical shapes. The convexities or concavities are closely packed to form the desired shape of the visual appearance of the device and utilize most of the emitted light. The visual appearance comprises a plurality of bright spots filling the desired shape. Within the desired viewing angle the brightness and appearance of the bright spots remain approximately unchanged.

In another arrangement the polylenticular form comprises a plurality of concavities extending around a further internal reflector, the front surface being of a curved or convex formation.

The invention will be understood by the following description of certain embodiments, by way of example, in conjunction with the accompanying diagrammatic drawings, in which.

Figure 1:
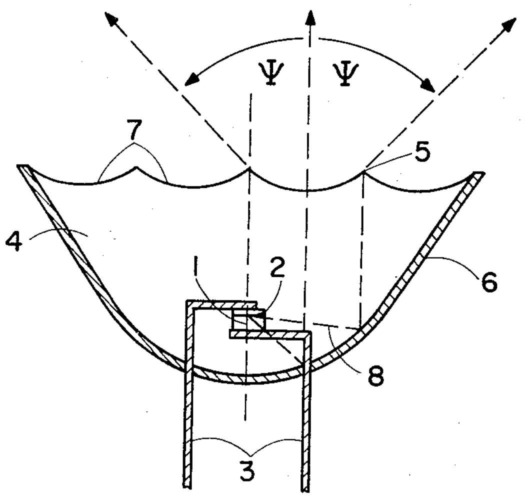
FIG. 1 is a cross-section through a rectangular device, on the line 1—1 of FIG. 2.
Figure 2:
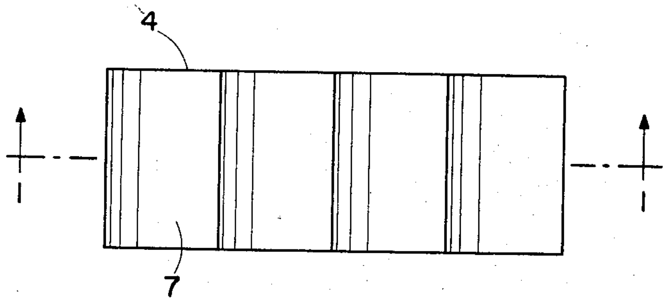
FIG. 2 is a plan view of the device of FIG. 1.

FIGS. 1 and 2 illustrate diagrammatically in simplified form an embodiment of the invention in the form of a solid state lamp. The lamp is at rectangular plan form, and comprises an active semiconductor element 1, having a P–N junction 2 which is capable of emitting visible light, for example GaP:Zn,O, and electrical leads 3 sealed in a transparent plastic capsule 4. The capsule 4 is of clear, or coloured transparent thermosetting resin suitable for transfer moulding in a liquid form, for example epoxy, silicone, polyester or diallylphthalate resin. A typical colour is red for GaP:Zn,O semiconductor. The whole lamp is encapsulated and its front face 5 is formed to a polylenticular structure.

Also, as an integral part of the lamp is a parabolic reflector 6. The reflector 6 collects light from the semiconductor element 1 and collimates it towards the front face 5. The reflector 6 is substantially a parabolic cylinder and the capsule is formed with the desired form during moulding. After moulding the parabolic surface is, for example, vacuum metallized with aluminum, a proper basecoat applied before and a protective top coat applied after the metallizing.

As shown, the front face 5 has a polylenticular form comprising 4 cylindrical concavities 7 side by side. The concavities 7 distribute the emitted light in the plane of FIG. 1, in accordance with the required viewing angle, employing optical refraction at the boundary between the encapsulating material and the surrounding air. A ray of light 8, emerging from the semiconductor element 1, is first collimated by the refelctor 6 and then refracted by the surface concavity, the concavity acting as a diverging lens which forms a virtual image visible in the required angle.

All the light reflecting or refracting elements are integral with the capsule. This optimizes the efficiency of the device and also simplifies manufacture. There is also an improvement in the visual appearance of the lamp without a significant increase in production expenses.

Figure 3:
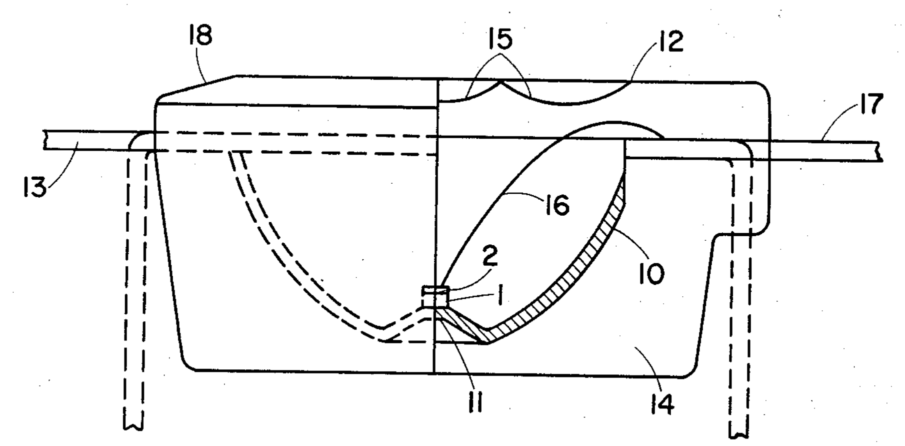
FIG. 3 is a side view, partly in section, of an alternative form of device.
Figure 4:
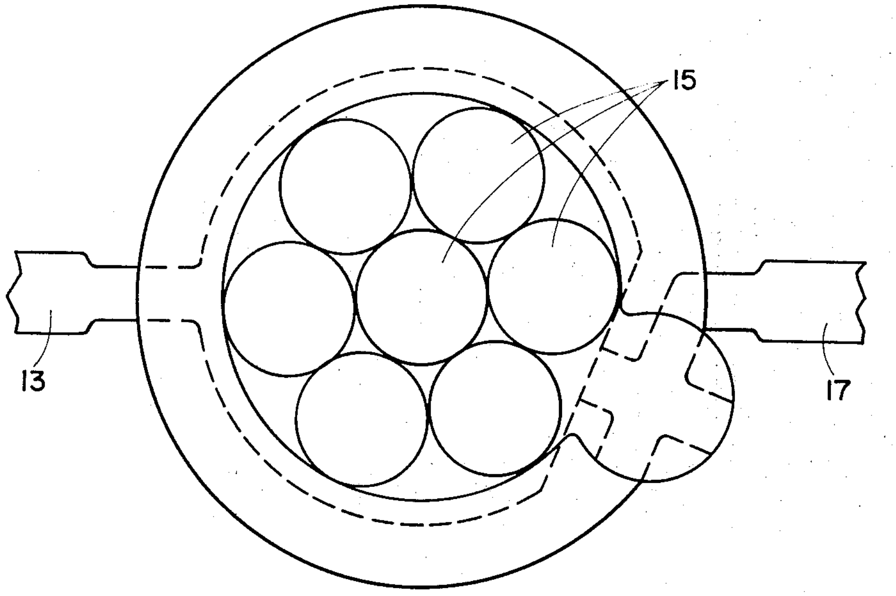
FIG. 4 is a plan view of the device of FIG. 3.

Instead of being formed on a surface of the capsule, the reflector can be formed separately, mounted relative to the semiconductor element and then encapsulated. Such an arrangement is illustrated in FIGS. 3 and 4, which Figures also illustrate an alternative final form of lamp. The lamp of FIGS. 3 and 4 is particularly suitable as an indicator lamp for a telephone set, and meets the requirement of being visible from any direction up to an angle of 45° from normal.

In this particular example, the semiconductor element 1, with P–N junction 2, is mounted directly on a reflector 10. Reflector 10 is an integral part of the lead structure of the lamp, and has a small pedestal 11 which positions the semiconductor element at the focal point of the reflector. The pedestal 10 is shaped so that the reflector does not reflect light onto the central part of the front face 12 since this part is already illuminated directly by the top surface of the semiconductor device 1. The reflector provides electric contact to one side of the junction 2 in the semiconductor element 1 and to the negative lead 13.

The lamp is encapsulated at 14 and the front face 12 is formed with a plurality of concavities 15. The lamp is circular and therefore the reflector is a paraboloid rather than a parabolic cylinder. Thus the concavities 15 are spherical, and in the present example six cavities are situated in a ring round a central cavity.

A wire 16 connects to the other side of the junction 2 in the semiconductor element 1 and to positive lead 17. The lamp is encapsulated after bonding and connecting the semiconductor element 1 to the lead structure are completed. The lamp is then fixed in a mould for transfer moulding. One lead frame can comprise many lamps, all moulded simultaneously. The lamps are preferably moulded with the front face 12 down so that any imperfections occur on the back part.

The size of the concavity 15 is selected so that the desired visibility requirements are met. As an example, each concavity 15 is 0.045 ins. diameter, the outside diameter of the lamp is approximately 0.200 ins., the bright spot images formed by the individual concavities are separated enough to be individually visible from a distance of 2m., and the total diameter of its visual image is approximately 0.100 ins. A radius of curvature for the concavities, equal to approximately 0.8 times the width of a recess gives satisfactory viewing up to ±45° from the axis through the device. The peripheral part of the capsule top is formed to include an inclined peripheral section 18 which causes a small portion of the light to emerge at an angle of approximately 90° relative to the vertical axis of the lamp. This peripheral section is useful in certain applications, for example as illustrated in FIGS. 5 and 6.

Figure 5:
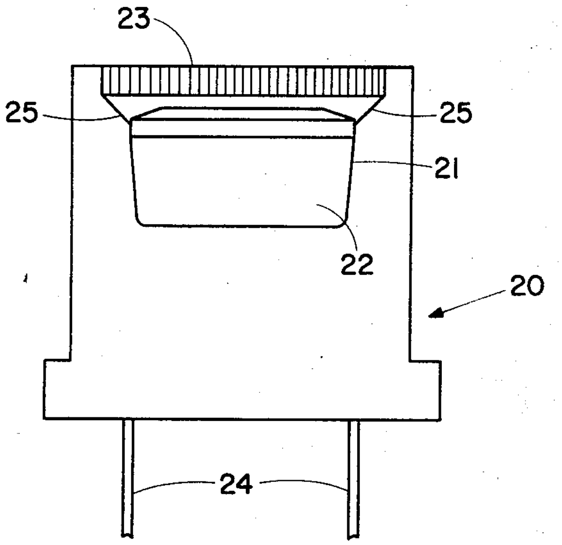
FIG. 5 is a cross-section through an indicator button incorporating the invention, on the line 5—5 of FIG. 6.
Figure 6:
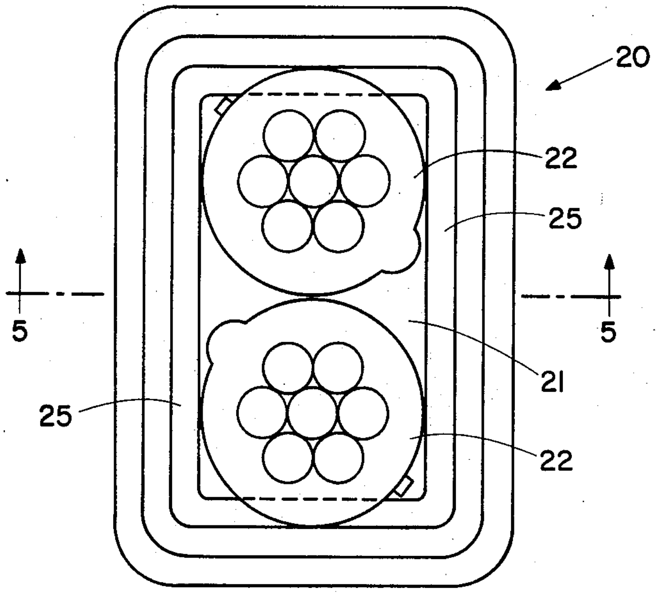
FIG. 6 is a plan view of the button of FIG. 5.

FIGS. 5 and 6 illustrate a key telephone pushbutton 20 having a recess 21 containing two lamps 22 each of the form as in FIGS. 3 and 4. The top of the button is filled with a contrast enhancing filter 23, for example Polaroid HRCP7 red circular polarizer, and the lamps 22 are positioned so that they face directly this filter. Connections are made to the lamps via leads 24.

Each lamp is intended to indicate different information in this example, and it is necessary that an operator, or user, should be able to distinguish readily which lamp is signalling, even in darkness. To provide for this a frame, forming a datum, is provided. This is obtained by forming a flat diffusing inwardly inclined surface 25 round the top periphery of the recess 21. The light emerging horizontally from the lamp, that is through the conical section 18 of FIG. 3, is scattered on the surface 24 making the contour, or outline, of the button visible.

Figure 7:
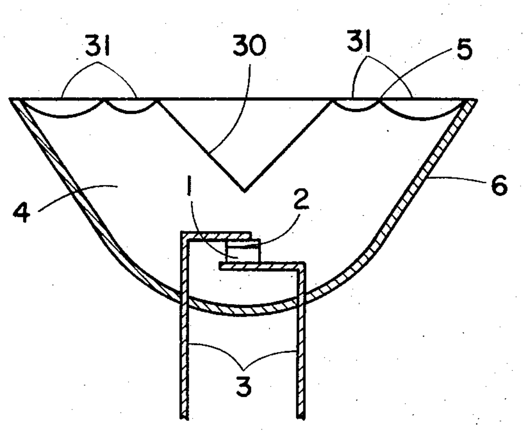
FIG. 7 is a cross-section through a further form of device, on the line 7—7 of FIG. 8.
Figure 8:
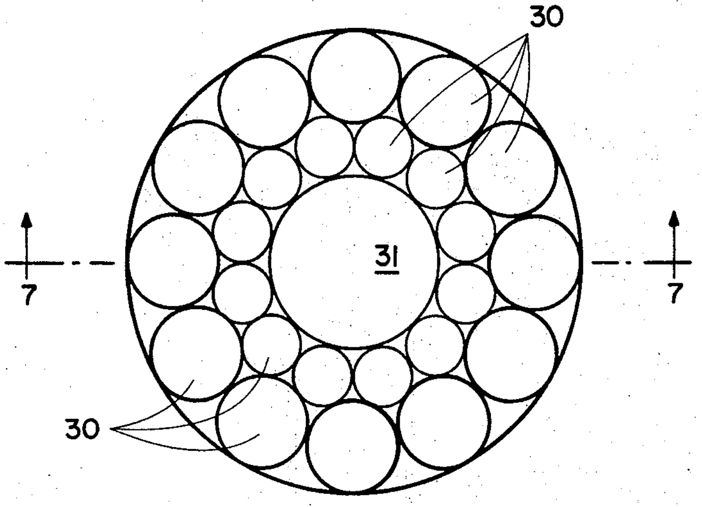
FIG. 8 is a plan view of the device of FIG. 7.

FIGS. 7 and 8 illustrate a further embodiment, with an alternative form of polylenticular front face. The semiconductor element 1 is mounted at the focal point of the reflector 6 which is formed by evaporation on the capsule 4, as described with respect to FIG. 1. The P–N junction is at 2 and leads 3 connect to a source of electric current. The front face 5 is formed with a central conical recess 30 surrounded by a series of concentric annuli of concavities 31.

The arrangement of FIGS. 7 and 8 enables the effective size of the lamp to be increased. The angle subtended by the central conical recess 30 is chosen so that it reflects light incident on it from the semiconductor element 1, in particular the light emitted from the top surface of the element. The light is reflected outwards by the sides of the conical recess 30 towards the reflector 6 where it is reflected towards the recesses 31. This extra light reflected to the recesses 31 enables the diameter of the annuli of recesses to be made longer than in the arrangement of FIG. 4, for example, without a reduction in brilliance. There will be a dark centre to the display corresponding to the diameter of the recess 31 at the front face. The size, or diameter, of the recess 31 can be varied, depending upon the increase in lamp size required. Increasing the recess diameter up to a value at which it reflects all the light incident on it, gives increase in lamp size without any substantial reduction in brilliance, while increase in size beyond this will reduce the brilliance.

Figure 9:
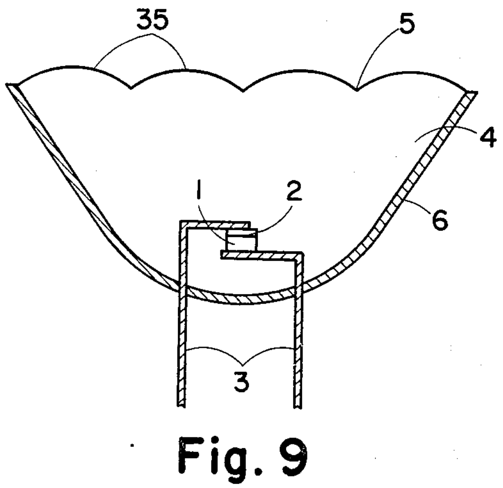
FIG. 9 illustrates a modification of the device of FIGS. 1 and 2.

FIG. 9 illustrates a further embodiment, in this instance a modification of the arrangement illustrated in FIG. 1. In this embodiment, instead of concavities, as in FIG. 1, the front face 5 has a polylenticular lens formation comprising a plurality of convexities 35. The convexities 35 act in a similar manner to the concavities 9 of FIGS. 1 and 2 in refracting the light reaching the front face 5.

If a semiconductor element 1 is used which emits light in the non-visible range, for example infrared, then a suitable phosphor converting the infrared radiation into visible light can be used, for example by coating directly on the semiconductor element, or by coating on to some other suitable support.

Figure 11:
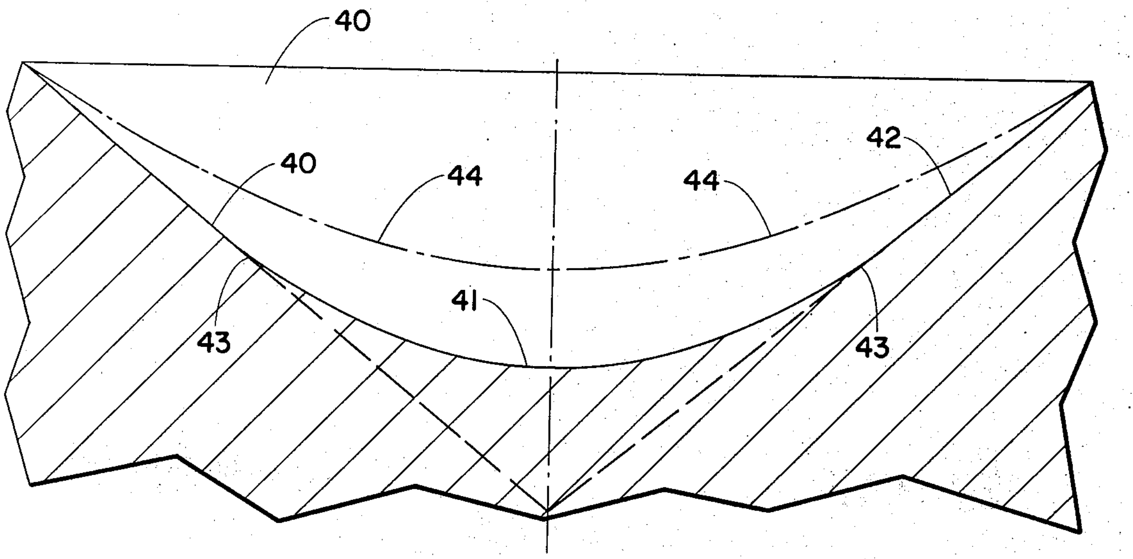
FIG. 11 is an enlarged cross-section of one concavity as in the device of FIG. 10.
Figure 10:
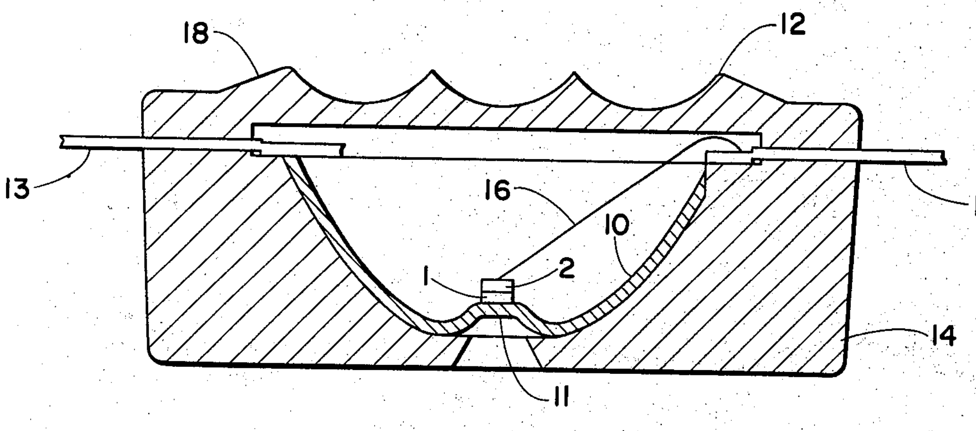
FIG. 10 is a cross-section through a device embodying a modified form of concavity.

FIG. 10 illustrates a lamp very similar to that illustrated in FIGS. 3 and 4, the difference being in the form of the concavities 15 of FIGS. 3 and 4. In the example of FIG. 10, the front face 12 has a plurality of concavities 40 of a slightly deeper form than the concavities 15 of FIGS. 3 and 4. The form of the concavities 40 is seen more clearly in FIG. 11. As shown the concavity has an inner portion 41 of spherical form, and an outer portion 42 which is conical, the two portions blending smoothly approximately at 43. The form of a concavity, as in FIG. 3, is shown by the chain dotted line 44 for comparison. This modified form provides increased luminous intensity of the lamp for viewing angles between approximately 20° and 40°, and is typical of modifications which can be made to the form of the concavities to modify the luminous intensity for differing requirements.

Figures 12, 13:
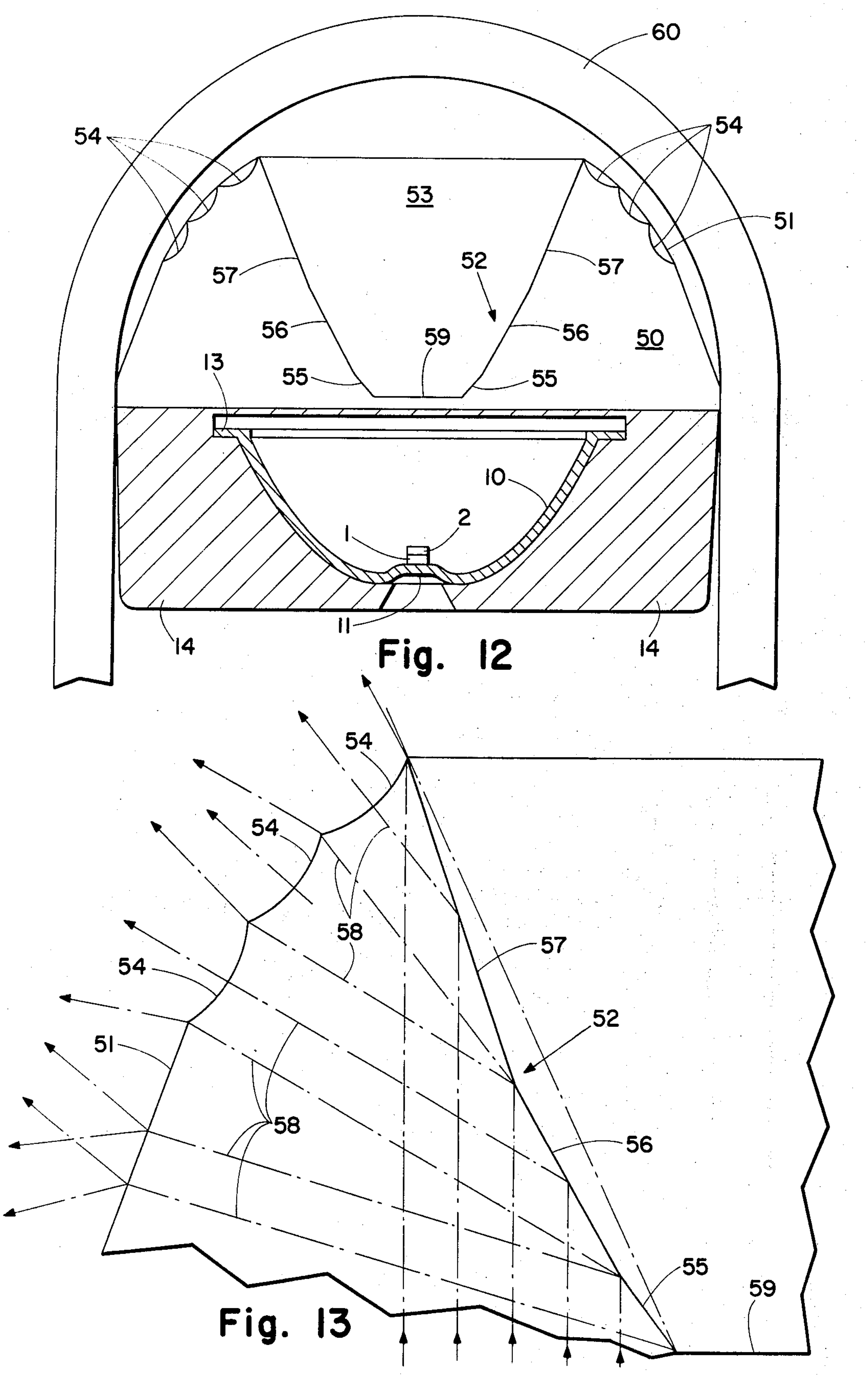
FIG. 12 is a cross-section through a further form of device having an internal reflector incorporated therein.
FIG. 13 is a partial cross-section of the lens structure of the device of FIG. 12 to a larger scale.

To improve the angle of viewing some losses in effectiveness must be accepted, such as sectoring and an increase in driving current for example. FIG. 12 is a cross-section through a lamp which will be visible practically from −90° to +90°. It will be seen that it is the front face or portion of the lamp which has been modified. The lamp has the semiconductor element 1 with a P–N junction 2 mounted on reflector 10 by means of pedestal 11, being encapsulated at 14. However in the present example the relatively flat front face of previous embodiments, for example FIG. 3, is replaced by a deeper structure 50. The front face 51 of the structure 50 is of a curved or arcuate form. An internal reflector 52 is formed in the structure by means of a central recess 53 and a plurality of lenticular cavities or shapes 54 is formed in the front face 51. These lenticular cavities 54, in the present example, are annular and extend around the internal reflector 52.

The central, internal, reflector 52 is composed of three conical sections 55, 56 and 57. The conical sections, the the lenticular cavities, are seen more easily in FIG. 13. The light emitted from the element 1 is reflected by the reflector 10 towards the internal reflector 52. The internal reflector 52 in turn reflects the light outwards through the polylenticular formation, formed by the cavities 54, and also through the remainder of the front face 51. Typical paths for rays of light from the reflector 10 are indicated by the chain dotted lines 58. Some light will also pass up through the flat base surface 59 of the structure 50.

As stated above, increasing the effective viewing angle - in the present example the angle approximately 180°- there are some losses. The driving current is higher since a larger solid angle must be covered. Also the optimal contrast filter cannot be used. Some sectoring will occur when the lamp is viewed at low viewing angles, i.e., from the side.

Conveniently, the lamp is inserted into a hemispherical cup 60. The cup protects the lamp structure against damage and dirt, particularly the central cavity or recess 53. The cup 60 can be of coloured transparent plastic to provide a spectral filter.

What is claimed is:

1. A solid state light emitting device for producing widely diffused light, comprising:- a body of transparent insulating material having a front surface and a rear surface, said front surface having formed thereon a polylenticular lens formation and said rear surface having formed thereon a parabolic light reflecting surface; a semiconductor light emitting diode mounted within said body of transparent insulating material in engagement with and at the focus of said parabolic reflecting surface, said reflecting surface being formed of electrically conducting material and forming one electrical lead to said diode, said diode emitting light laterally toward said reflecting surface and said reflecting surface reflecting said light toward said front surface to issue through said front surface, said polylenticular lens formation comprising a central cavity and a plurality of spherical cavities surrounding said central cavity, said cavities dispersing said light issuing through said front surface.

2. A device as claimed in claim 1, wherein said central cavity is of concial form, the apex of the conical form extending inward toward the semiconductor element and having an included angle such that the light incident on the central recess from the semiconductor element is reflected outwards towards the reflector.

3. A device as claimed in claim 1, said front surface being of convex form, and an internal reflector positioned between said light emitting diode and said front surface, the internal reflector being of conical formation with its apex toward said light emitting diode and its base at said front surface, said polylenticular lens formation comprising a plurality of annular lens formations extending around the base of the internal reflector, the internal reflector arranged to deflect light outward through said lens formation.

4. A device as claimed in claim 3, the internal reflector comprising a plurality of conical sections in sequence, the section nearest said light emitting diode being of largest included angle with each succeeding section being of a smaller included angle.

* * * * *